Feb. 22, 1966  R. E. BEGO ETAL  3,235,921
BLOW TUBE STRUCTURE WITH REMOVABLE LINER
Filed May 18, 1964
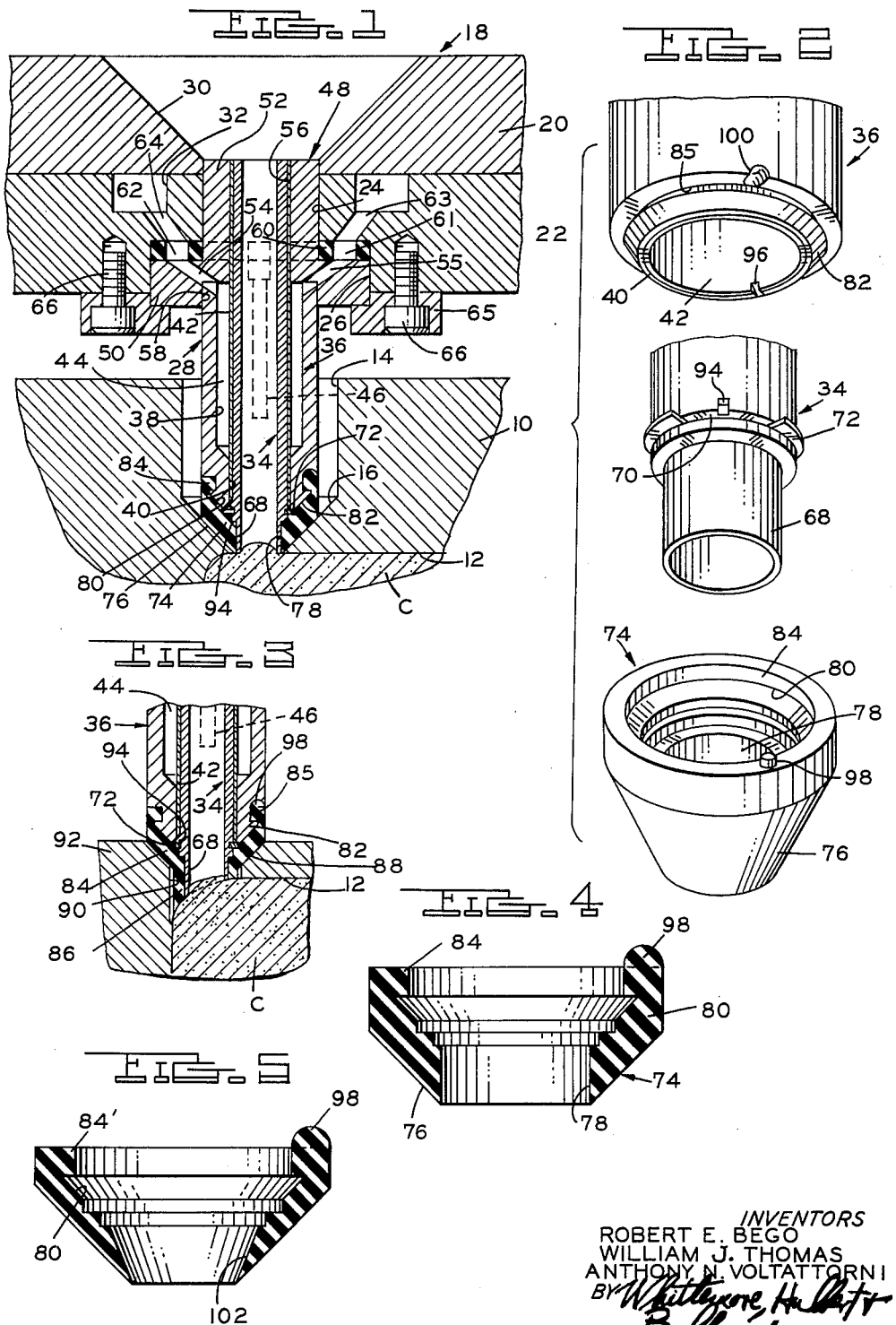
INVENTORS
ROBERT E. BEGO
WILLIAM J. THOMAS
ANTHONY N. VOLTATTORNI
BY
ATTORNEYS United States Patent Office
3,235,921
Patented Feb. 22, 1966

1

3,235,921
BLOW TUBE STRUCTURE WITH
REMOVABLE LINER
Robert E. Bego, Bloomfield Hills, William J. Thomas, Birmingham, and Anthony N. Voltattorni, Detroit, Mich., assignors to Progress Pattern Co., Southfield, Mich., a corporation of Michigan
Filed May 18, 1964, Ser. No. 368,288
9 Claims. (Cl. 22—10)

The present application is a continuation-in-part of our copending application, Serial No. 270,425, filed April 3, 1963, now Letters Patent No. 3,163,894 of January 5, 1965. The present invention relates to improvements in a blow tube unit or structure for use in a foundry blow plate assembly of the type shown and described in that patent which is of the general type currently employed in the molding and baking of foundry cores of sand treated with a thermally settable resin compound, such as furfural, blown under pneumatic pressure from a magazine atop a cooled blow plate assembly into a hot core box therebeneath to mold the sand in a cavity or cavities of the box.

The furfural sets up quite rapidly under heat, actually being capable of setting by itself somewhat above normal room temperature, for example, 100° F. Accordingly, since the blow plate assembly and any sand discharge components thereof are in direct engagement with the hot core box in the blowing operation, these parts become heated, with the result that curing or setting of the furfural commences quickly, and with the further result that the tube discharge mouth to or at the core box is apt to become clogged unless provisions are made to cool both the blow plate proper and its component blow tube units.

Our application identified above deals with provisions to this end, including a novel and improved basic design of the blow tube unit or sub-assembly, per se; and the present application is directed to further specific and practical improvements and refinements in such unit, structure or sub-assembly which render it more cheaply produced and assembled, more readily serviced, and in general better adapted to meet working conditions.

In accordance with the present invention, the blow tube structure is constituted generally, as in the parent application identified above, by a standard internal tube of stainless steel or like stock in a desired O.D. and bore size, cut to a desired length; an external jacket inexpensively produced from tubular stock by an inexpensive screw machine operation, which jacket surrounds the tube length to afford a water circulating passage about the latter; and a base adapter, standard in its external dimensions for all sizes of tube unit and also inexpensively turned as required. Likewise, as in the earlier construction, the jacket and adapter are fixedly assembled in partially telescoped relation to one another, as by hydrogen brazing.

However, in accordance with an object of the present invention, the blow tube part or component of the tube assembly is made removable from the jacket and adapter parts which coaxially encircle it, being readily releasable from the jacket and adapter sub-assembly for sliding removal therefrom, to be replaced when necessary or desired by a corresponding tube member, or after inspection or servicing.

In accordance with a further specific improvement, the union of the water circulating jacket and adapter to one another is made through the agency of an elongated cylindrical liner, which is fixedly secured at its top to the adapter, being telescoped in the bore of the latter, and at its bottom to the jacket, being also telescoped in the bore of that part. The adapter, jacket and liner are preferably united by hydrogen brazing, which may be performed at the time that the jacket and adapter are hydrogen brazed to one another.

A further specific improvement over the invention of our patent is in the use of a somewhat resilient plastic tip of frusto-conical shape (which as before matingly engages a core box recess) as an agency or means to releasably hold the removable blow tube in place within the cylindrical liner that is assembled in a unitary way with the blow tube jacket and adapter.

To this end, the blow tube is fitted adjacent its lower end with an external snap ring externally engageable from beneath with the lower end of the hydrogen brazed liner and jacket; and the plastic tip has a readily releasable, mated snap fit with the jacket in a way to upwardly hold the tube's snap ring against the liner and jacket.

In still further accordance with the invention, means are provided to insure that the plastic tip will always be thus mated to the jacket in one predetermined and same angular relation to the latter, and that the tube, after removal and replacement, shall likewise also be in a given predetermined angular relation to the jacket, hence to the adapter and to the blow plate opening in which the adapter is received, and also to the tip.

The purpose of this is to enable the lower end of the blow tube proper, and a plastic tip telescoped thereon, to be initially ground or otherwise formed in a contour following and flush with an internal contour of a cavity of the core box into which this end of the blow tube assembly extends. Insurance is given by the angular registering means referred to above that the blow tube and tip will always have the desired precise flush relationship with the contour of the core box cavity directly beneath the blow tube structure.

Another specific improvement of the invention resides in an individually cooled blow tube structure in which the cylindrical blow tube proper has an elongated, reduced diameter bottom extension integral therewith, and the plastic tip for the blow tube is also provided with an elongated, integral discharge sleeve portion externally telescoping the tube extension snugly. These parts extend to a desired substantial distance into the hot upper half of the core box, and may be ground to contour the lower end thereof to the box cavity, as mentioned above. The blow tube end is in any event, whether specially contoured or not, stable within the core box recess in which its tip mates.

Otherwise, and in general accordance with the principles of the blow tube assembly of our patent, the presently improved blow tube structure is fabricated in its entirety of readily available and assembled tube, jacket and adapter parts, as well as the liner internally united to the last two parts and slidably receiving the blow tube proper. The adapter is standardized in its external dimensions for reception in and removal from a standard-sized hole and hole counterbore of the blow plate assembly. Flow of circulating water into, through and from the cooling jacket surrounding the jacket and adapter liner is, as before, through porting of the adapter flange. Thus, the tube structure can be made from standard parts in a very compact design, indeed; which permits the blow tube assemblies to be mounted very compactly together to occupy a large number of closely spaced blow plate holes, without the use of external water circulating tubing such as would render a comparable close spacing impossible.

The foregoing as well as other objects will become more apparent as this description proceeds, especially when considered in connection with the accompanying drawing, illustrating preferred embodiments of the invention, wherein:

FIG. 1 is a fragmentary view in axial section through the improved blow tube unit or structure, as mounted to a blow plate to extend into a cavity of a core box filled with sand blown into it through the tube unit;

FIG. 2 is an exploded perspective view of the jacket, tube and tip components of the tube structure;

FIG. 3 is a fragmentary view in section similar to FIG. 1, illustrating the modification of extensions of the tube and its tip to contour them to conform with the core box cavity contour; and FIGS. 4 and 5 are views in axial section through alternative designs of yieldable discharge tip adapted to be releasably assembled to the removable blow tube proper, both showing an integral registering formation on the tip.

Referring to FIG. 1, the reference numeral 10 generally designates the upper half of a two-part cast iron core box, the mating parts of which are formed to provide one or more core forming cavities 12. The core box 10 is externally heated to a temperature of about 400° F. by any suitable means (not shown) which will not interfere with the motions of its parts relative to one another in use.

The upper part 10 of the core box is conventionally provided with a suitable number (depending upon the number and size or design or the civities 12), of upwardly opening filling holes 14, each shaped to provide a frusto-conical bottom seat 16 opening directly to the cavity, and coming flush with the top of the latter, for the pneumatic pressure filling of the cavity with furfural-treated sand.

The blow plate assembly of the invention is generally designated 18, being preferably designed as shown in our above-identified application, to which reference may be made. It includes upper and lower steel plates 20, 22, respectively, bored or otherwise apertured in vertical registration with one another at points determined by and corresponding to the location of the filling holes 14 of the core box 10. Thus, referring to FIGS. 1, 2 and 4, the lower plate 22 has cylindrical bores 24 and counterbores 26 for the individual reception of the improved blow tube sub-assemblies or units, generally designated 28, of the invention. The upper plate 20 is formed to provide downwardly tapering frusto-conical openings 30, into the lower zone of which the blow tube assembly 28 upwardly telescopes a bit.

The blow plate assembly constitutes the base or floor panel of a sand reservoir or magazine which is from time to time replenished with sand and is kept under a sufficient pneumatic pressure during the core forming operation to discharge the sand in entrainment with a blast of air through the openings 30 into the blow tube units 28 and, as the latter are mounted to the supporting blow plate unit 18 and engaged with the core box seats 16, directly into the cavities 12 for form cores C.

As described in the parent application, the upper surface of bottom blow plate 22 is formed to provide, as covered and sealed by upper plate 20, water circulating passage means, generally designated 32, for the rapid and efficient circulation of a large volume of water to and from the various individual blow tube units or assemblies 28 for a quick and efficient removal of the heat from the latter.

Each tube unit or sub-assembly 28 is assembled, pursuant to the broader invention of our patent, of inexpensively prefabricated tubular components. It includes an inner length 34 of standard stainless steel or like tubing, being optionally cut in any desired length at the time of fabrication of the blow tube unit 28.

The unit 28 also includes an external tubular jacket part 36 which is turned from tubular stock, as by a screw machine operation. Jacket 36 is formed to an inner bore diameter at 38 substantially exceeding the outer diameter of steel tube 34 and, like the latter, its axial length is chosen to suit the intended installation.

In accordance with the present improvement, a bottom, reduced diameter throat extension 40 of jacket bore 38 receives an elongated, thin walled cylindrical steel liner 42, and in this axial zone the jacket 36 and liner 42 are tightly united and sealed together, as by hydrogen brazing.

An annular space 44 of substantial width and axial length is thus provided between jacket 36 and liner 42, through which space water is circulated from and back to the plate passage 32. A proper directional flow of circulation is insured by diametrically spaced baffles 46 subdividing space 44, which baffles may be appropriately secured to one or both of the liner and jacket components at the time of assembly of blow tube unit 28.

The blow tube unit or structure 28 also includes a base adapter 48 of cold rolled steel which will be, in so far as its external peripheral dimensions are concerned, standard for all designs of tube and jacket components 34, 36, respectively. The adapter 48 has an enlarged cylindrical base flange 50 of an outer diameter to fit snugly in the counterbore 26 of bottom blow plate 22, and, above that flange, an integral upstanding cylindrical sleeve extension 52, which is similarly proportioned to be telescoped in the smaller bore 24 of plate 22. Adapter 48, as thus externally standardized, adapts various sizes of tube and jacket components for replaceable use on blow plate assemblies having different patterns of distribution of their blow holes 30, 24. A pair of radially inwardly and downwardly inclined ports 54 and 55 are drilled through the enlarged flange 50 of adapter 48 into communication with the annular water circulating space 44 of unit 28.

Pursuant to the invention, the inner diameter of the jacket liner 42 is such as to receive the tube 34 with sliding tolerance; and adapter 48 has a bore 56 adapted to tightly receive the liner 42, the latter extending the full axial length of this bore. The adapter also has a bottom counterbore at 58 adapted to tightly receive the top of jacket 36.

With the tube, liner, jacket and adapter components chosen as described, the liner 42 is fitted in the adapter bore 56 and hydrogen brazed in place therein, just as the jacket 36 is fitted and hydrogen brazed in place in adapter counterbore 58. Of course, the brazing of the bottom end of the liner in the jacket bore 40 will also preferably be performed at this time. There thus results a unitary structure of pre-fabricated adapter, jacket and liner parts.

An apertured compressible gasket 60 is telescoped over adapter extension 52, and the gasket has intake and return ports 61, 62 adapted to be aligned for communication of the respective flange intake and return ports 54, 55 of adapter 48 with the plate circulatory passage 32, through ports 63, 64 in plate 22. As thus disposed, the blow tube unit 28 may be held fixedly in place by a clamp ring 65 marginally engaging the adapter 48 from beneath and secured by bolts 66 threaded upwardly into bottom blow plate 22.

An important feature of the present improvement resides in the use, as indicated above, of the blow tube component 34 of unit 28 which is readily removable for replacement when and if desired, by sliding movement in the axial direction in the jacket liner 42.

For this purpose, reference being had to FIG. 2 in conjunction with FIG. 1, the blow tube 34 is provided, in somewhat upwardly spaced relation above an integral elongated, relatively thin walled bottom extension 68, with a circumferentially extending groove 70 adapted to receive a split resilient snap ring 72. Such ring serves as an axial abutment to engage upwardly against the lower end of the jacket 36, also liner 42 fixedly engaging and terminating flush with that end, as shown in FIG. 2. This represents the fully inserted position of tube 34 proper within the jacket and adapter structure.

So positioned, the tube is held in place by means of its resiliently compressible tip 74, fabricated of an appropriate, thermally resistant material, such as the plastic resin known as Viton. This tip is formed with a bottom frusto-conical surface 76 shaped for mating engagement with the frusto-conical bottom 16 of core box hole 14.

The tip 16 has a bottom axial opening 78 proportioned for a slip-on telescoping fit over the bottom tubular extension 68 of tube 34; and upwardly of its opening 78 tip 74 is adapted to have upward abutting engagement with the snap ring 72 on the tube. Still further upwardly (FIGS. 1 and 2) the tip has an undercut annular internal recess at 80, which is adapted to have a releasable snap-on engagement about a frusto-conical bottom formation 82 of jacket 36, an annular, inwardly facing tip bead or rim 84 snapping into place in an annular groove or recess 85 about jacket 36 above the formation 82. Thus, the core box engaging and sealing plastic tip 74 also serves as a means for holding the blow tube 34 proper in place in its coacting jacket liner. All that need be done to replace the tube with a new one is to snap off the tip, whereupon tube 34 is readily slid outwardly of the liner.

The tube assembly 28 may either be furnished with a plastic tip 74 having a frusto-conical outer wall or surface 76 and a cylindrical bore 78 snugly surrounding tube extension 68; or the tip may be of the cross-sectional outline shown in FIG. 3, such tip being specially designated 84. Otherwise similar to the tip 76, the tip 84 has a cylindrical, elongated bottom extension 86 directly adjoining its frusto-conical surface 88, which cylindrical portion is receivable well downwardly in an upright cylindrical hole 90 of the core box, which is designated 92 in this instance.

Furthermore, the tube and tip bottom extensions 68, 86, respectively, may either come flush with the top of the core box cavity 12, in the fashion indicated in FIG. 1, or they may be ground off or otherwise formed at their bottom in any desired shape or extent, as shown in FIG. 3, to a contour conforming with and coming flush with a non-rectilinear surface of the core box cavity 12. In either case, the plastic tip 74 or 84 is internally stabilized by the rigid tubular extension 68 during blowing of sand. A small quantity of the latter which may be left on the core C after baking is readily removed from the core.

Assuming that it is desired to specially contour the bottom end of the tube in the fashion of FIG. 3, the invention also contemplates means whereby it is insured that the tube 34, once removed from the liner, jacket and adapter sub-unit, can always be replaced in exactly the same previous angular relation to the latter; and that the tip 84 can always be accurately re-registered angularly relative to the tube. Thus, the bottom contour of tube and tip will always be returned in the same, flush relationship with the top of the core box cavity 12.

To these ends, and as best shown in FIG. 2, the tube has a small spur or nib 94 upset outwardly from its external surface directly above and adjacent its snap ring groove 70; and the liner 42 and bottom end of frusto-conical jacket formation 82 are provided with a small, radially struck-in recess 96. This recess is adapted to be aligned with and receive the tube spur 94, so that the tube 34, once removed from the jacket 36 and its liner 42, may always be returned therewithin in exactly the same angular relation to the jacket as prior to removal, or replaced by another similar tube member in that exact relation.

Similarly, and as also best shown in FIG. 2, the plastic tip 74 is formed on its top annular bead portion 84 to provide a small, integral upright button 98 which is engageable in a downward-facing recess 100 in the jacket 36 directly above its frusto-conical bottom formation 82. Accordingly, just as the tube may be replaced in the jacket in a desired angular relationship thereto, the tip may correspondingly be snapped into place on the jacket end in an accurately predetermined relationship, angular-wise, to the jacket structure, hence to the tube registered relative to the latter. For the sake of standardization, all jacket, tube and tip components are formed with the registering provisions described above, although they have predominate significance in instances of a tube specially contoured at its bottom end, per FIG. 3 of the drawing.

FIGS. 4 and 5 illustrate alternative embodiments, shown in larger scale, of plastic seating or sealing tip, that of FIG. 4 representing the tip appearing in FIGS. 1 and 2, hence bearing corresponding reference numerals.

The embodiment of the tip shown in FIG. 5 is quite closely similar, differing primarily from that of FIG. 4 in that its bottom discharge opening 102 is of frusto-conical shape, rather than cylindrical as shown in the other figures. Accordingly, other corresponding parts appearing in FIG. 5 and corresponding to FIG. 4 are designated by corresponding reference numerals, primed, and further description may be dispensed with.

The invention affords a tube unit or structure 28 prefabricated in its entirety of readily available parts. These include the liner 42 having fixed, preferably hydrogen brazed, unions at its bottom and top with the jacket 36 and adapter 48, as well as a comparable union of the jacket and adapter. The tube member 34 is held in place in the liner through the agency of the same resilient plastic tip as serves to seat and seal tube unit 28 in the core box hole 10. The tube may be quickly and easily removed and replaced for inspection and cleaning alone, or in the event of deterioration; and a replacement in accurately registered relation to the jacket and adapter sub-unit is insured.

What we claim as our invention is:

1. A blow tube structure for use with a core-forming blow plate, comprising an annular water circulating jacket member, a tubular liner member secured within said jacket member, said jacket and liner members providing a water circulating space surrounding the latter, an elongated blow tube member axially slidable in said liner member for removal therefrom, and means normally holding said tube member against sliding separation from said liner member, said tube member having an end projecting coaxially from said liner member and being adapted to be specially formed at said projecting end, said tube and liner members having coacting means to hold the same assembled in predetermined angular register with one another relative to the common axis thereof.

2. A blow tube structure for use with a core-forming blow plate, comprising an annular water circulating jacket member, a tubular liner member secured within said jacket member, said jacket and liner members providing a water circulating space surrounding the latter, an elongated blow tube member axially slidable in said liner member for removal therefrom, said tube member being axially exposed at one end thereof, and a flexible annular tip member telescopingly applied to at least one of said jacket and tube members adjacent an opposite, axially exposed end of the latter, said tip member and at least one of said jacket and liner members having means normally holding said tube member against sliding separation from said liner member when the tip member is thus applied, said tube member projecting coaxially of said liner member at said axially exposed end and being adapted to be specially formed at the latter, said tube, liner and tip members having coacting means to hold the same assembled in predetermined angular register with one another relative to the common axis thereof.

3. A blow tube structure for use with a core-forming blow plate, comprising an annular water circulating jacket member, a tubular liner member secured within said jacket member, said jacket and liner members providing a water circulating space surrounding the latter, an elongated blow tube member axially slidable in said liner member for removal therefrom, said tube member being axially exposed at one end thereof, and a flexible annular tip telescopingly applied to said jacket and tube members adjacent an opposite, axially exposed end of the latter, said tip, tube member and jacket member having means normally holding said tube member against sliding separation from said liner member when the tip is thus applied, including a fixed radial element on said tube member with which said tip and said tube member have axial abutting engagement, and means on said tip releasably engageable with the jacket member to normally hold said tip in said abutting engagement and prevent said separation of the tube member from the liner member.

4. A blow tube structure for use with a core-forming blow plate, comprising a unitary assembly of prefabricated parts including an annular adapter part to be mounted to said blow plate in alignment with a hole of the latter, an annular water circulating jacket part coaxial with said adapter part, and a tubular liner part axially aligned with said adapter and jacket parts and fixedly secured to both thereof to hold the three parts in said unitary assembly, said jacket and liner parts providing a water circulating space surrounding the latter; and an elongated blow tube part received in said liner part for axial sliding movement therein to remove the same from the liner part, said tube part being axially exposed at one end through said adapter part, there being means adjacent the opposite end of said tube part which coacts with at least one of said jacket and liner parts in preventing the removal of the tube part from the liner part in the direction of said one end of the tube part.

5. A blow tube structure for use with a core-forming blow plate, comprising a unitary assembly of prefabricated parts including an annular adapter part to be mounted to said blow plate in alignment with a hole of the latter, an annular water circulating jacket part coaxial with said adapter part, and a tubular liner part axially telescoped in said adapter and jacket parts and fixedly secured to both thereof to hold the three parts in said unitary assembly, said jacket and liner parts providing a water circulating space surrounding the latter and said adapter part having means to communicate said space with the exterior of said tube structure; an elongated blow tube part received in said liner part for axial sliding movement therein to remove the same from the liner part, said tube part being axially exposed at one end through said adapter part; and a flexible annular tip telescopingly applied to at least one of said jacket and tube parts adjacent an opposite, axially exposed end of the latter, said tip and said tube and jacket parts having means holding said tube part against sliding separation from said liner part when the tip is thus applied.

6. A blow tube structure for use with a core-forming blow plate, comprising a unitary assembly of prefabricated parts including an annular adapter part to be mounted to said blow plate in alignment with a hole of the latter, an annular water circulating jacket part coaxial with said adapter part, and a tubular liner part axially telescoped in said adapter and jacket parts and fixedly secured to both thereof to hold the three parts in said unitary assembly, said jacket and liner parts providing a water circulating space surrounding the latter; an elongated blow tube part received in said liner part for axial sliding movement therein to remove the same from the liner part, said tube part being axially exposed at one end through said adapter part; and a flexible annular tip telescopingly applied to at least one of said jacket and tube parts adajacent an opposite, axially exposed end of the latter, said tip and said tube and jacket parts having means holding said tube part against sliding separation from said liner part when the tip is thus applied; said tip and said tube and jacket parts having means to register the same in predetermined angular relation to one another.

7. A blow tube structure for use with a core-forming blow plate, comprising an annular adapter part to be mounted to said blow plate in alignment with a hole of the latter, an annular water circulating jacket part coaxial with said adapter part, and a tubular liner part coaxially and fixedly telescoped in said adapter and jacket parts, said jacket and liner parts providing a water circulating space surrounding the latter; an elongated blow tube part received in said liner part for axial sliding movement therein and removal therefrom, said tube part being axially exposed at one end through said adapter part; and a flexible annular tip telescopingly applied to said jacket part and tube part adjacent an opposite, axially exposed end of the latter, said tip and said tube and jacket parts having means holding said tube part against sliding separation from said liner part when the tip is thus applied, including a fixed radial element on said tube part with which said tip has axial abutting engagement, and means on said tip releasably engageable with the jacket part to normally hold said tip in said abutting engagement and prevent said separation of the tube part from the liner part; said tip and said tube and jacket parts also having means to register the same in predetermined angular relation to one another.

8. In an improved jacketed blow tube unit for use in a blow tube structure which may constitute part of a core-forming blow plate, and in association with a blow tube element adapted to be slidably telescoped in the unit, as well as a flexible annular tip element adapted to be removably applied to said unit, said blow tube unit comprising a unitary assembly of prefabricated parts including an annular adapter part having means to mount the same to said blow plate, an annular water circulating jacket part coaxial with and fixed to said adapter part, and a tubular liner part axially telescoped in and fixed to said jacket part, thus to hold the three parts of said unit in said unitary assembly, said jacket and liner parts providing a water circulating space surrounding the latter and said adapter part having means to communicate said space with the exterior of said tube structure; the improvement of said unit to provide a formation on one of said jacket and liner parts which is engageable by a portion of said blow tube element to hold the latter in a predetermined coaxial and angularly restrained relation to the jacket and liner parts, said jacket part being externally formed adjacent an end thereof remote from said adapter part to provide means removably and matingly engageable by a portion of said tip element to removably hold the latter on said blow tube unit in a predetermined coaxial and angularly restrained relation to said jacket and liner parts and to said blow tube element.

9. The improvement in accordance with claim 8, in which said formation on one of said jacket and liner parts comprises a recess on said liner part matingly engaged by said portion of said blow tube element, said jacket part being externally formed to provide a recess matingly engaged by said portion of said tip element.

References Cited by the Examiner
UNITED STATES PATENTS

| | | | |
|---|---|---|---|
| 2,052,713 | 9/1936 | Juffa | 285—177 |
| 2,607,968 | 8/1952 | Peterson | 22—10 |
| 2,761,186 | 9/1956 | Peterson | 22—10 |

FOREIGN PATENTS 848,809   9/1960   Great Britain.

J. SPENCER OVERHOLSER, *Primary Examiner.*

MARCUS U. LYONS, *Examiner.*